(12) United States Patent
Kochhar et al.

(10) Patent No.: US 11,765,112 B2
(45) Date of Patent: *Sep. 19, 2023

(54) CONTEXT DRIVEN DYNAMIC ACTIONS EMBEDDED IN MESSAGES

(71) Applicant: VMware, Inc., Palo Alto, CA (US)

(72) Inventors: Arjun Kochhar, Bangalore (IN); Suman Aluvala, Bangalore (IN); Arvind Maan, Bangalore (IN); Nitin Sethi, Bangalore (IN); Ramesh Pilla, Bangalore (IN); Shree Harsha Shedigumme, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,970

(22) Filed: Jul. 1, 2021

(65) Prior Publication Data
US 2021/0328952 A1  Oct. 21, 2021

Related U.S. Application Data

(63) Continuation of application No. 16/815,083, filed on Mar. 11, 2020, now Pat. No. 11,082,373.

(51) Int. Cl.
*H04L 51/02* (2022.01)
*H04L 12/58* (2006.01)
*H04L 51/063* (2022.01)
*H04L 51/046* (2022.01)
*G06Q 10/107* (2023.01)
*G06F 40/216* (2020.01)
*G06F 40/258* (2020.01)
(Continued)

(52) U.S. Cl.
CPC ......... *H04L 51/063* (2013.01); *G06F 40/216* (2020.01); *G06F 40/258* (2020.01); *G06F 40/268* (2020.01); *G06Q 10/107* (2013.01); *H04L 51/046* (2013.01)

(58) Field of Classification Search
USPC ........................................................ 709/206
See application file for complete search history.

(56) References Cited

U.S. PATENT DOCUMENTS 6,636,733 B1  10/2003  Helferich
7,174,453 B2   2/2007  Lu
(Continued)

*Primary Examiner* — Jude Jean Gilles
(74) *Attorney, Agent, or Firm* — Thomas | Horstemeyer, LLP

(57) ABSTRACT

Disclosed are various approaches for dynamically creating content to present to a user based on an identified intent, or other context, associated with a message (e.g., email). A message that is received from a message server can be analyzed to identify the message content within the message prior to distributing to the recipient client device. Trained intent identification models can be applied to the identified message content to determine an intent, or other type of context, associated with the message. Upon identifying the intent, the message header can be modified to include the intent prior to forwarding the message to the recipient client device. The client device can then display a user interface including the message and a user interface element corresponding to a third-party service. The user interface element can be dynamically generated to include an action component that upon selection, triggers an action associated with the intent.

20 Claims, 6 Drawing Sheets

(51) Int. Cl.
  *G06F 40/268*  (2020.01)
  *G06F 40/56*  (2020.01)
  *G06F 16/9032*  (2019.01)

(56) References Cited

U.S. PATENT DOCUMENTS

| | | | |
|---|---|---|---|
| 7,844,484 B2 * | 11/2010 | Arnett | G06Q 30/0204 |
| | | | 705/7.33 |
| 8,732,828 B1 * | 5/2014 | Martini | H04L 63/1483 |
| | | | 726/22 |
| 10,157,614 B1 * | 12/2018 | Devaraj | H04L 51/42 |
| 10,186,266 B1 * | 1/2019 | Devaraj | G10L 13/08 |
| 10,186,267 B1 * | 1/2019 | Devaraj | H04L 67/303 |
| 10,326,518 B1 * | 6/2019 | Magley | H04L 69/08 |
| 11,082,373 B1 * | 8/2021 | Kochhar | H04L 51/06 |
| 2002/0174061 A1 | 11/2002 | Srinivasan et al. | |
| 2005/0058261 A1 | 3/2005 | Baumard | |
| 2005/0240617 A1 | 10/2005 | Lund et al. | |
| 2013/0282481 A1 * | 10/2013 | Kent | G06Q 30/0251 |
| | | | 705/14.49 |
| 2014/0051379 A1 | 2/2014 | Ganesh et al. | |
| 2015/0029038 A1 | 1/2015 | MacNeille et al. | |
| 2016/0065525 A1 | 3/2016 | Dye et al. | |
| 2016/0092550 A1 * | 3/2016 | Kraft | G06F 16/9535 |
| | | | 707/737 |
| 2016/0192161 A1 | 6/2016 | Lynn et al. | |
| 2017/0041889 A1 | 2/2017 | Liu et al. | |
| 2018/0012139 A1 * | 1/2018 | Schmid | G06Q 10/10 |
| 2018/0352393 A1 | 12/2018 | Lottermoser et al. | |
| 2019/0124031 A1 | 4/2019 | Trudeau et al. | |
| 2019/0200385 A1 * | 6/2019 | Xue | H04W 74/002 |
| 2019/0281661 A1 * | 9/2019 | Magley | H04W 88/06 |
| 2021/0044547 A1 * | 2/2021 | Bradley | H04L 51/02 |

\* cited by examiner

CONTEXT DRIVEN DYNAMIC ACTIONS EMBEDDED IN MESSAGES

CROSS-REFERENCE TO RELATED APPLICATIONS

This application is a continuation of and claims the benefit of U.S. patent application Ser. No. 16/815,083, filed Mar. 11, 2020 and entitled "Context Driven Dynamic Actions Embedded in Messages," which is incorporated entirely herein by reference.

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, a company can require the employee to enroll with a management service capable of protecting enterprise data from theft, loss, and unauthorized access.

In the enterprise setting, individuals can utilize a number of different services and applications that are provided by the enterprise. Some of these services are hosted in a third-party environment and some can be hosted on servers operated by the enterprise. These individuals can use authentication credentials to login to these application or services. For example, a user might have an email account or an account with a third-party customer relationship management service. Accessing data within these services can be accomplished through a device with which the user is authenticated.

In some situations, a user may receive a message that requires the user to access another application to perform a particular action associated with the content of the message. For example, the user may receive a message requiring the user to update source code that is associated with a given project or attach screenshots to a ticket. In these types of situations, the user may have to access an alternative device (e.g., laptop), access a virtual private network (VPN), perform additional authentication actions, or other actions in order to address the content of the message. This can be frustrating and time consuming to a user when the user has to take extra steps to perform an action associated with the message.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to dynamically creating content to present to a user based on an identified intent, or other context, associated with a message (e.g., email). For example, when a message is received for distribution to a given user in an enterprise setting, the message content can be analyzed to identify an associated intent of the message. The identified intent can further be used to dynamically generate user interface elements that include action components that can trigger an action associated with the intent. In conjunction with a display of the message for the user, the user interface element can be displayed to the user to allow the user to trigger the action without having to leave a messaging application, access other devices, undergo additional authentication, or other actions that can potentially frustrate the user.

In various examples, intent identification models can be trained to identify a context, or underlying intent, of the message. For example, a message may correspond to an application development application and may include a request for the recipient to modify a version of code. As such, the intent may be identified as "modify code." In another example, the message may correspond to a request for the recipient to update a discount percentage on an opportunity. In this example, the intent or actionable item may correspond to "update discount." In another example, the message may relate to a request for the recipient to approve a particular document, and the intent of the message is for the user to "approve." As discussed, the intent identification models can be trained to recognize the various types of intents associated with particular messages. In various examples, the different models can be associated with different third-party services that users in an enterprise environment may interact with.

According to various examples, a message header associated with the message can be embedded with the identified intent. When a messaging application, or other client application, receives the message with the embedded intent, the messaging application can send a content request to a workflow service that is configured to interact with and obtain information from different third-party services. According to various examples, the content request can include the intent and an identification of a third-party service associated with the message. In response to the content request, the messaging application can receive a user interface element (e.g., card component) that can be integrated with the message and displayed by the messaging application. According to various examples, the user interface element can be dynamically created to include action components that correspond to the identified intents. As such, the user can trigger the action associated with the intent of the message without being redirected to a different application.

Figure 1:
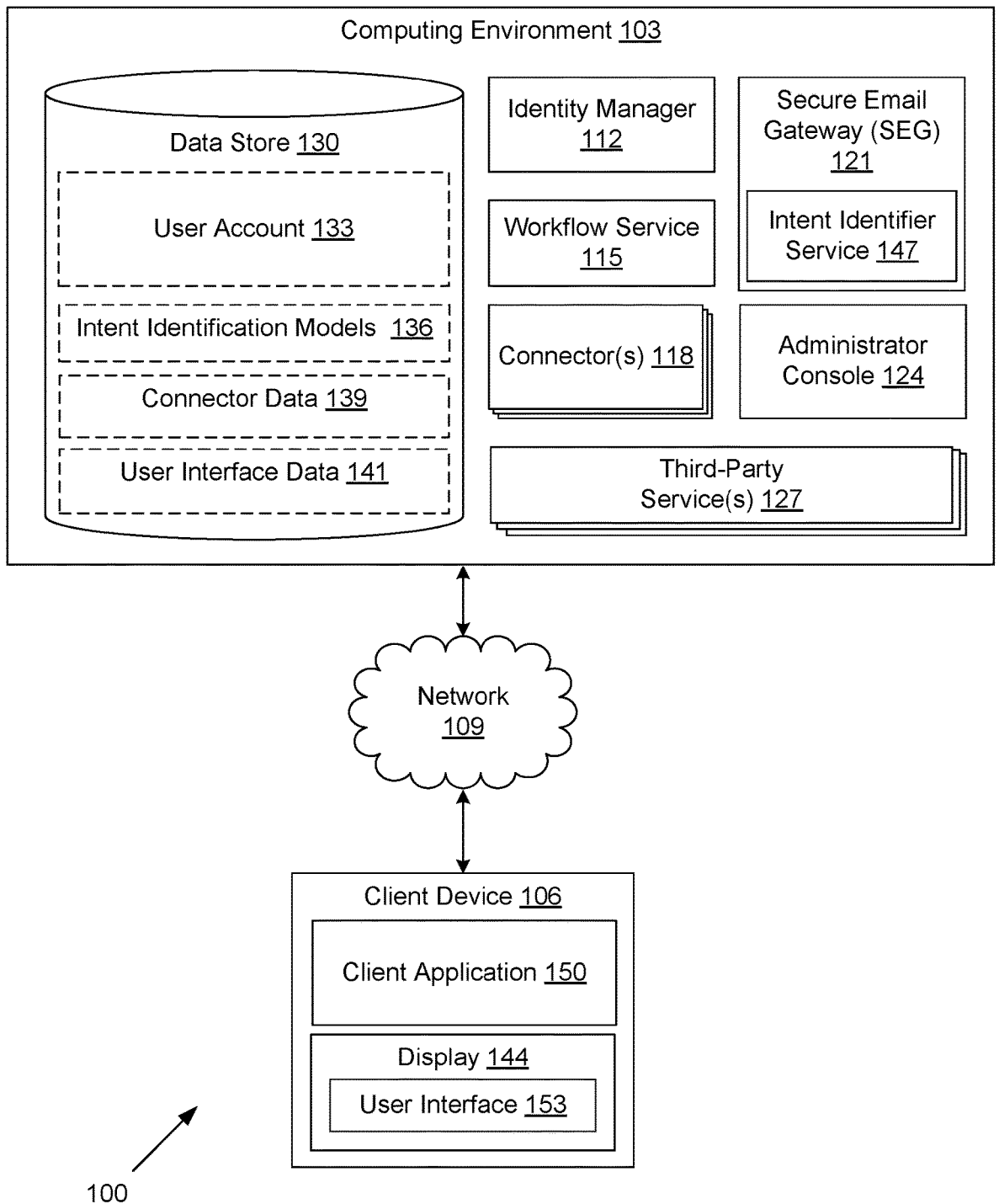
FIG. 1 is a schematic block diagram depicting an example of a network environment.

Beginning with FIG. 1, shown is an example of a networked environment 100. The networked environment 100 includes a computing environment 103 and a client device 106 which are in data communication with each other across a network 109. The network 109 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 112, a workflow service 115, connector(s) 118, a secure email gateway (SEG) 121, and an administrator console 124. One or more third-party services 127 can also be executed in the computing environment 103. In some examples, however, one or more of the third-party services 127 can be executed in a separate computing environment that is in data communication with the computing environment 103 across the network 109.

Also, various data is stored in a data store 130 that is accessible to the computing environment 103. The data store 130 can be representative of a plurality of data stores, which can include relational databases, object-oriented databases, hierarchical databases, hash tables or similar key-value data stores, as well as other data storage applications or data structures. The data stored in the data store 130 is associated with the operation of the identity manager 112, the workflow service 115, the connector(s) 118, the secure email gateway 121, the administrator console 124, and one or more third-party services 127 as well as potentially other applications or functional entities described later. This data can include one or more user accounts 133, intent identification models 136, connector data 139, user interface data 141, and potentially other data.

The identity manager 112 can authenticate users and manage user authorizations or permissions to access applications, data, or other computing resources. For example, the identity manager 112 can correspond to a single sign-on portal that verifies a user's authentication credentials, issues a single sign-on authentication token that identifies the user, and verifies whether the user has the appropriate access permissions to access one or more third-party services 127. Examples of identity managers 112 include AMAZON's AWS Identity and Access Management (IAM) service, VMWARE's Identity Manager, or MICROSOFT's Active Directory Federation Services.

The workflow service 115 can manage enterprise workflows performed by users of the client devices 106. The workflow service 115 can also manage authentication with services that are utilized as backend services for the workflows. The workflow service 115 can monitor one or more services that a user is authorized to access. For example, the workflow service 115 can periodically query a service for notifications, updates, messages, changes, actions to be performed, or other events. If such an event is identified, the workflow service 115 can then notify the user. For example, the workflow service 115 can send a message to the client device 106 to notify the user. The operating system of the client device 106 can include a notification framework that provides a notification for the message using the client device 106. The notification can include a sound notification generated using an audio device, a visual notification using a display device, and haptic feedback using a haptic device.

In various examples, the workflow service 115 can generate a request or receive a request from a client device 106. For example, the workflow service 115 can use a connector 118, if enabled, to interact with a corresponding third-party service 127 based on action requests received from the client device 106 for actions to be performed by the corresponding third-party service 127.

The connector 118 can provide a standardized mechanism for the workflow service 115 to communicate with a third-party service 127. Each third-party service 127 can provide an application programming interface (API) for communicating, querying, or otherwise interacting with the third-party service 127, which can include different methods or functions with different parameters compared to other third-party services 127. This can allow for the workflow service 115 to send a single, uniformly formatted query to one or more connectors 118. Each connector 118 is then responsible for using the information provided in the query from the workflow service 115 to invoke the appropriate functions provided by the API of the third-party service 127. If a change is made to the API of the third-party service 127, the connector 118 between the workflow service 115 and the third-party service 127 can be updated without having to modify the workflow service 115 itself.

In some examples, the connector 118 can generate a user interface element that can be presented to a user via the client application 150. The user interface element can comprise, for example, a card component, or other type of element, that provides information associated with the third-party service 127 that is accessible through the connector 118. For example, the user interface element can comprise a card component that describes information associated with a given project of the enterprise that is provided by the third-party service 127. In some examples, the user interface element can include predefined static components that are each associated with a given action that can be performed by the third-party service 127. In other examples, the connector 118 can generate the user interface element to include dynamically generated components based on an identified intent in a content query request received from the client application 150 through the workflow service 115. For example, the static components may be associated with actions for "watch", "open", and "comment." However, the intent of the message may be identified as "fix the version." As such, the connector 118 can generate or modify a user interface element associated with the content query request to include a component that is specific to the identified intent. In this example, upon display of the user interface element in conjunction with the displayed message via the client application 150, the user can select the dynamically generated component to trigger the action associated with the intent. In another example situation, the user may receive a message from another user asking the user to approve a particular matter. In this example, the user interface element displayed to the user in relation to the rendered email message can include an action component that triggers an approve action based on the identified intent.

The secure email gateway 121 can enable secure email or other types of messaging access and distribution through the network 109 to client devices 106 within an enterprise environment. For example, the secure email gateway 121 can behave as a proxy server linking an enterprise email server and network of client devices 106. According to various examples, an administrator can define enterprise polices via interactions with the administrator console 124. The enterprise polices can be pushed to the secure email gateway 121 and used by the secure email gateway 121 for enforcement.

In various examples, the secure email gateway 121 can include an intent identifier service 147. The intent identifier service 147 can analyze received messages from a message server to determine an intent, or other type of context, from a message. For example, the intent identifier service 147 can analyze the received messages to identify the message content within a received message. In some examples, the message content can be parsed to identify one or more terms within the message content. The intent identifier service 147 can apply one or more pre-defined intent identification models 136 to extract or otherwise determine an intent in a message. Upon identifying the intent of the message, the intent identifier service 147 can modify the message header by embedding the identified intent in the header. The intent identifier service 147 can be a plugin or a standalone application. In various examples, an administrator, via interactions with the administrator console 124 can identify which intent identification models 136 are to be used by the intent identifier service 147. As such, the intent identifier service 147 can upload or otherwise obtain the intent identification models 136 for use in response to the administrator input. In other examples, the intent identification models 136 can be integrated with a release of the secure email gateway 121.

The administrator console 124 can provide an administrative interface for configuring the operation of individual components in the networked environment 100. For example, the administrator console 124 can provide an administrative interface for the workflow service 115, the secure email gateway 121, identity manager 112, and the connectors 118. For example, an administrator of an enterprise can configure the secure email gateway 121 with a variety of operational configurations with respect to the access and distribution of messages received from a message server. In some examples, the administrator can define and provide the intent identification models 136 to be used by the secure email gateway 121 with respect to analyzing message content to determine an intent or other type of context.

A third-party service 127 can be a web application, web service, or other network facing application that can be accessed using a shared identity manager 112. In some examples, a third-party service 127 can include enterprise-specific applications, device management applications, social networking applications, word processors, spreadsheet applications, media player applications, or other applications. One or more third-party services 127 can be provided by the same provider or by different providers. Example third-party services 127 can include SALESFORCE, JIRA, CONCUR, FACEBOOK, GITHUB, SERVICENOW, VMWARE WORKSPACE ONE, LINKEDIN, and other types of applications.

The user account 133 represents information associated with a user. The information can include one or more authentication credentials, one or more single sign-on tokens, and connector settings, and other types of user related data. Other information about the user can also be stored as part of the user account 133, such as the user's name or contact information and associated device data.

The intent identification models 136 include trained models that can be used for determining intent or other types of context from the message content within a message. According to various examples, the intent identification models 136 can be based on natural processing language tools to learn and determine the intent, or other context, associated with a message. For example, the learned intent identification models 136 can be based on natural processing language tools including, for example, LUIS.ai, Wit.ai, APi.ai, Watson, or other types of natural processing language tools.

In some examples, the intent identification models 136 are associated with respect to a particular third-party service 127. For example, a particular third-party service 127 can initiate or otherwise facilitate actions that can be triggered based on a user's interaction with the message. These actions may include, for example, editing a program, providing comments, requesting a correction, or other actions. The intent identification model 136 can be trained to understand a context or intent of a message with respect to the different actions that the third-party service 127 can perform or otherwise facilitate based on the message content. In this example, assume that the message content included the terms "fix the version." The intent identification model 136 can be trained to identify the message intent to be associated with requesting the user to "fix the version" of something. This identified intent can be embedded in the message header and sent to the client device 106. The identified intent can be used by the client application 150, the workflow service 115, or third-party service 127 to dynamically generate content that can be presented to a user from within the user's messaging application, or client application 150, without requiring the user to directly access the third-party service 127 or further authentication through a virtual private network (VPN).

The connector data 139 includes configuration data associated with the connectors 118. As discussed, the connector 118 can refer to a service or component of the workflow service 115 that can fetch information that may be required by a user of a client device 106. In some examples, the connector data 139 can include data that can be used to determine which connector 118 to use in response to a content query received from a client device 106. For example, the client device 106 may send a request to the workflow service 115 requesting an interaction with a particular third-party service 127. The request may include information identifying the service which can be used to identify the appropriate connector 118. The connectors 118 can be mapped to different keywords and structures identified in the connector data 139. For example, the connector data 139 can include a directory of keywords that can be associated with different third-party services 127 and connectors 118. In some examples, the workflow service 115 can compare a received content query from the client device 106 with the list of keywords to identify which connector 118 to use to access information that the user of the client device 106 is requesting. If one or more terms in a content query match a keyword in the connector data 139, the workflow service 115 can identify the connector 118 mapped to the keyword and request data from the required third-party service 127 using the appropriate connector 118. In another example, the connector data 139 can include a content structure that can be mapped to a particular connector 118. For example, the content structure can include a defined structure or layout of terms that can be unique to a particular third-party service 127.

In some examples, the connector data 139 can include data associated with the generation of user interface components by the connector 118 in response to a content query request received from the client application 150 through the workflow service 115. In some examples, the user interface element can include predefined static components that are each associated with a given action that can be performed by the third-party service 127. In other examples, the connector 118 can generate the user interface element to include dynamically generated components based on an identified intent in a content query request received from the workflow service 115 and client application 150. The connector data 139 can include rules that can be used to determine when and which static components are to be replaced by other dynamically generated components. For example, the static components may be associated with actions for "watch", "open", and "comment." However, the intent of the message may be identified as "fix the version." As such, the connector 118 can generate or modify a user interface element associated with the content query request to include a component that is specific to the identified intent. In some examples, the connector data 139 may include rules or weights that can be applied to the different actions for determining an ordering of presentation of the components associated with a given action. In some examples, the rules can define which components associated with different actions are to be included in a user interface element. For example, components can be selected based on an importance of the action based on the intent relative to other actions that can be presented to the user.

User interface data 141 can include images, text, code, graphics, audio, video, and other content that can be served up by the client application 150, the secure email gateway 121, connectors 118, the third-party service 127, or other suitable software components in the computing environment 103. To this end, user interface data 141 can include static content or static elements of content, for example, in hypertext markup language (HTML), extensible markup language (XML), or any other language suitable for creating content. Further user interface data 141 can include code that generates dynamic user interfaces 153 when executed or interpreted in the computing environment 103 or client device 106. Such code can be written in any suitable programming language, such as PHP, Perl, Objective C, Java, Ruby, etc. User interface data 141 can also include code configured to be executed or interpreted within a client device 106 in order to render dynamic content or user interface elements. Such code can be referred to as applets and can be written in any suitable programming language, such as JavaScript, Java, etc.

The client device 106 is representative of a plurality of client devices 106 that can be coupled to the network 109. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 144, such as liquid crystal displays (LCDs), gas plasma-based flat panel displays, organic light emitting diode (OLED) displays, electrophoretic ink ("E-ink") displays, projectors, or other types of display devices. In some instances, the display 144 can be a component of the client device 106 or can be connected to the client device 106 through a wired or wireless connection.

The client device 106 can execute various applications such as one or more client applications 150, and/or other applications. The client application 150 can render a user interface 153 on the display 144. The client application 150 can represent various types of applications executable by the client device 106. For example, the client application 150 could be a web browser and the user interface 153 could include a web page rendered within a browser window. As another example, the client application 150 could be an email application and the user interface 153 could represent a graphical user interface for viewing, editing, and composing emails. Likewise, the client application 150 could be a chat or messaging application, and the user interface 153 could represent a graphical user interface for sending and receiving messages with another user.

Figure 2:
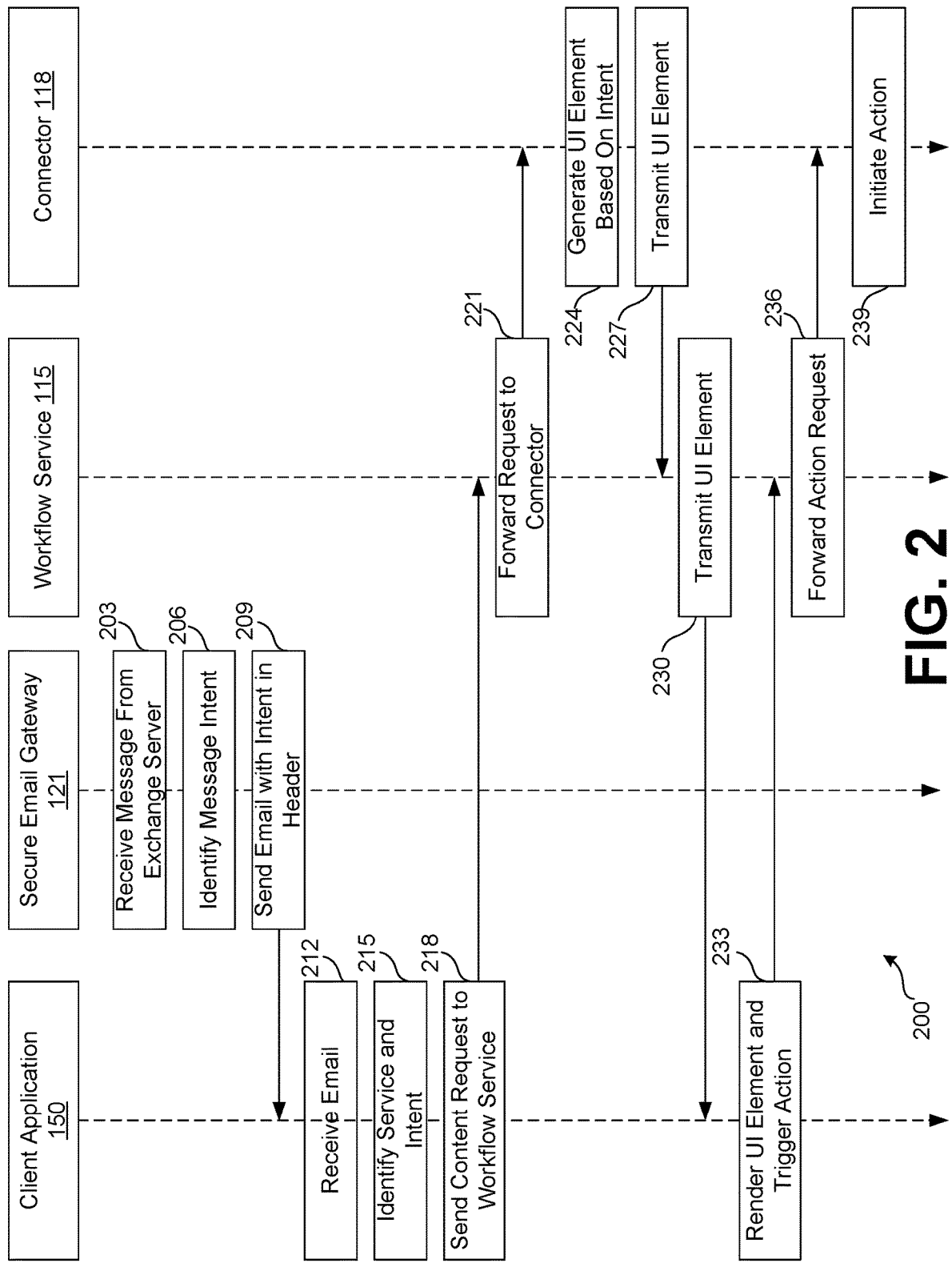
FIG. 2 is a sequence diagram depicting the operation of components of the network environment of FIG. 1.

Turning now to FIG. 2, shown is a sequence diagram 200 illustrating functionality implemented by components of the networked environment. It is understood that the sequence diagram of FIG. 2 provides merely an example of the many different types of functional arrangements that can be employed to implement the portions of the network environment 100 as described herein. As an alternative, the sequence diagram of FIG. 2 can be viewed as depicting an example of elements of a method implemented within the network environment 100 in some implementations, At step 203, the secure email gateway 121 receives a message (e.g., an email) from a message exchange server (e.g. Microsoft Exchange®). The secure email gateway 121 is a proxy service between the message exchange server and the network of client devices 106 within the enterprise environment. The secure email gateway 121 can access and distribute messages received from the message exchange server in accordance to access permissions assigned by an administrator.

At step 206, the secure email gateway 121 via the intent identifier service 147 identifies the intent of the message. As will be discussed in greater detail with respect to FIG. 4, the intent identifier service 147 can analyze the message to identify the message content. In some examples, the message content is parsed to identify individual terms that can be used to determine context. In various examples, the intent identifier service 147 can apply one or more intent identification models 136 to the message content to identify whether there is a recognized intent in the message content. The intent identification models 136 are models that are trained to identify the context, or intent, of the message based on an analysis of the content. In some examples, the intent identification models 136 can output an intent along with a score that identifies the likelihood that the intent is associated with the message. For example, based on analysis, the intent identification models 136 may output that there is a seventy-five percent (75%) likelihood that the intent of the message is to "fix a version".

In various examples, the intent identifier service 147 can select particular intent identification models 136 from a set of intent identification models 136 based on particular keywords identified in the message content. For example, the intent identification models 136 may include a keyword bank which can be compared to the terms extracted from the message content. If there is a match of keywords between the keyword bank of a particular intent identification model 136 and the message content, the intent identifier service 147 will apply the particular intent identification model 136.

In some examples, multiple intents may be identified in response to applying multiple intent identification models 136. Upon receiving intents from the output of the intent identification models, the intent identifier service 147 can determine whether the intent is to be passed on to the client device. For example, if the score associated with a particular intent meets or exceeds a predefined threshold, the intent identifier service 147 can determine that the message intent is to be passed on. Otherwise, the intent identifier service 147 can determine that the identified intent should not be passed on to the client device and no further action is taken.

At step 209, the intent identifier service 147 modifies the message header to include the identified intent. In particular, the intent identifier service 147 can embed the intent in the message header so that the client application 150 can extract the intent upon receipt. In some examples, there may be multiple identified intents. As such, the intent identifier service 147 can embed multiple intents in the message header. In some examples, the different intents can have different levels of priority or importance. The priority can be based on the output score from the intent identification models 136 or other rules that may define a level of importance or priority for different types of intents.

At step 212, the client application 150 receives the message from the secure email gateway 121. In particular, the message is directed to the user associated with the client device 106 and the client application 150 receives the message accordingly.

At step 215, the client application 150 identifies the intent associated with the message and the corresponding third-party service 127. In particular, the client application 150 can identify the intent by parsing the message header to extract the embedded intent. In addition, the client application 150 can identify the third-party service 127 associated with the message. For example, the client application 150 can identify the third-party service 127 associated with the message based on message properties included in the message or message header. In another example, the sender of the message can be used to identify the third-party service 127 associated with the message. For example, the sender's email address may include the name of the third-party service 127, and the client application 150 can parse the email address to identify the email address. In some examples, the server from which the message was sent can be used to identify the third-party service 127.

At step 218, the client application 150 generates a content request to the workflow service 115. For example, the content request can include a request for a user interface element, such as, for example, a card component, that includes information associated with the identified third-party service 127. In various examples, the content request can include an identification of the intent(s) and an identification of the corresponding third-party service 127 and connector 118. The client application 150 can be configured to integrate the content associated with the request with the rendering of the message received from the secure email gateway 121.

At step 221, the workflow service 115 receives the content request and forwards the requests to the corresponding connector 118. For example, the workflow service 115 can identifier the connector 118 based on the information included in the content request. In some examples, the content request identifies the particular connector 118. In other examples, the content request may include an identification of the third-party service 127 which the workflow service 115 can map to the corresponding connector 118.

At step 224, the connector 118 receives the content request and generates a user interface element (e.g., card component) based on the intent identified in the content request. In particular, the connector 118 may modify a preconfigured user interface element with static action components to replace a given static component with a dynamically created component that is associated with the identified intent. In other examples, the connector 118 dynamically generates the user interface element based on the intent. In some examples, the connector 118 can determine an order of presentation of the action components included in the user interface element. The presentation of action components can be based on the types of actions to be presented and the identified intent. If there are multiple intents identified, the connector 118 may generate or modify a user interface element to include all or a selection of the intents via action components. For example, the connector 118 may rank the different intents based on a likelihood that they apply to the message content and select a top portion of the intents for display in the user interface element.

At step 227, the connector 118 transmits the generated or modified user interface element to the workflow service 115.

At step 230, the workflow service 115 receives the user interface element from the connector and transmits the user interface element to the client application 150 in response to the content request.

At step 233, the client application 150 renders the user interface element with the message and, in response to a user interaction with an action component of the user interface element, triggers the action by sending an action request to the workflow service. In particular, the client application 150 can integrate the user interface element within the display of the message received from the secure email gateway 121. As discussed, the user interface element can include action components that correspond to different actions that can be initiated or facilitated by the corresponding third-party service 127. At least one of the action components is dynamically generated to correspond to the identified intent associated with the action. A user can interact with the user interface element and select a particular action component which in turn triggers the action request. Upon identifying a selection of the particular action component, the client application 150 can send an action request to the workflow service 115 with respect to the corresponding action.

At step 236, the workflow service 115 forwards the action request to the corresponding connector 118.

At step 239, the connector 118 receives the action request and initiates the action. For example, the connector 118 can contact the corresponding third-party service 127 to access data associated with the action request based on the request. In this example, if the action relates to fixing a version of a software project, the connector 118 may reach out to the third-party service 127 to obtain elements associated with the software project that need to be modified by the user associated with the client device 106. Thereafter, this portion of the process proceeds to completion.

Figure 3A:
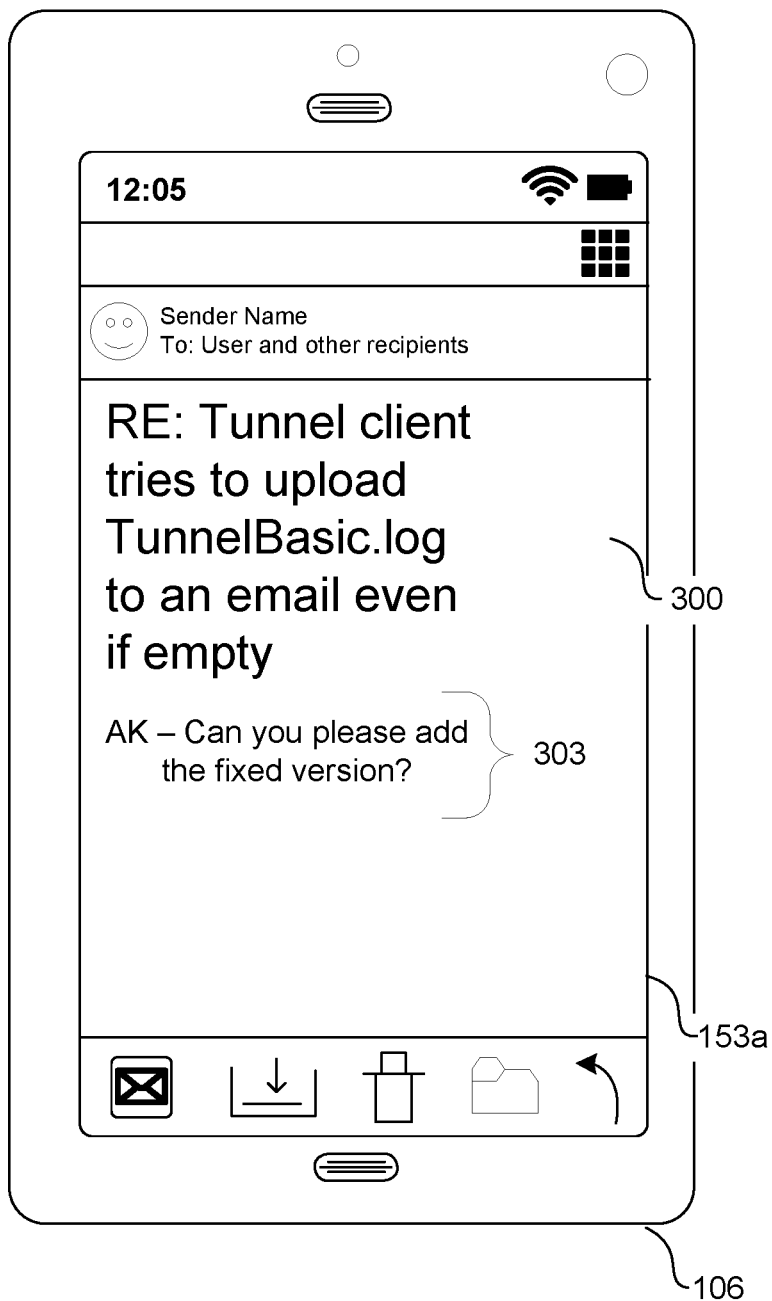
FIGS. 3A-3C are example user interfaces of a client application executed on a client device of the network environment of FIG. 1.
Figure 3B:
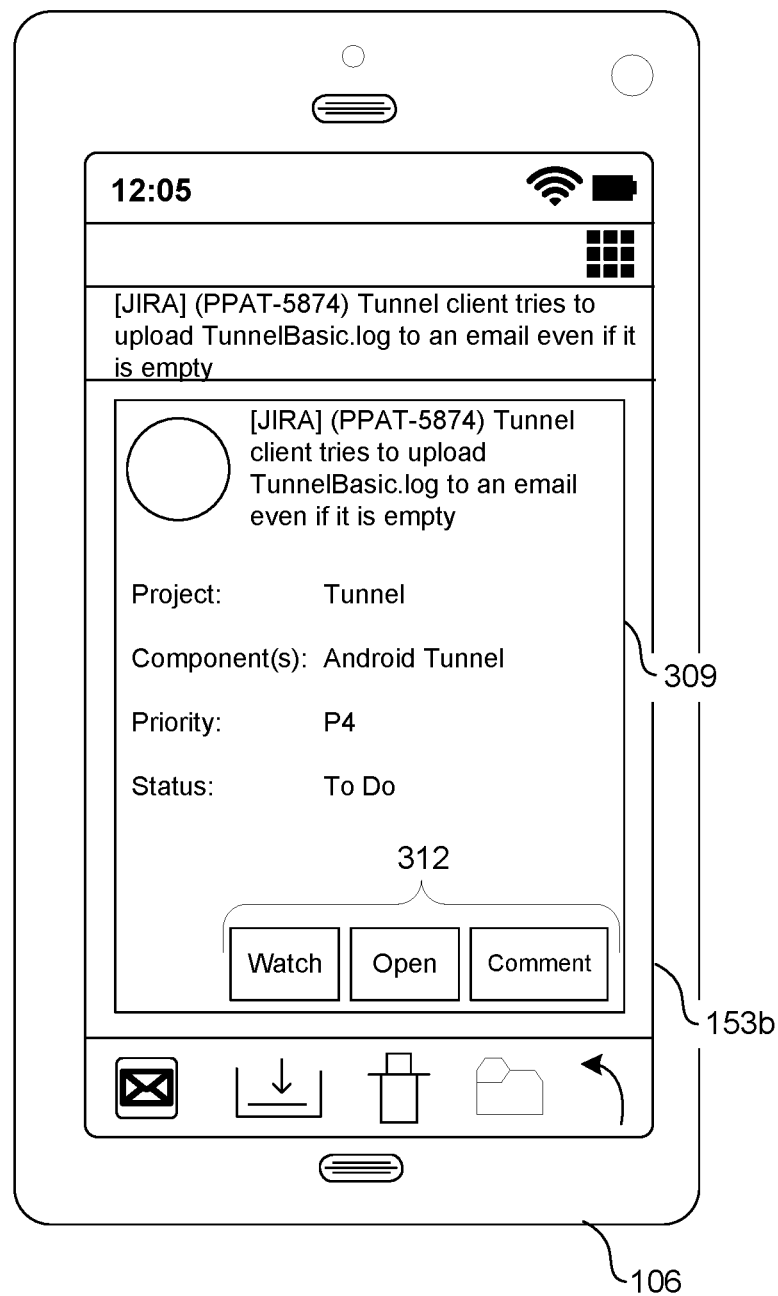
Figure 3C:
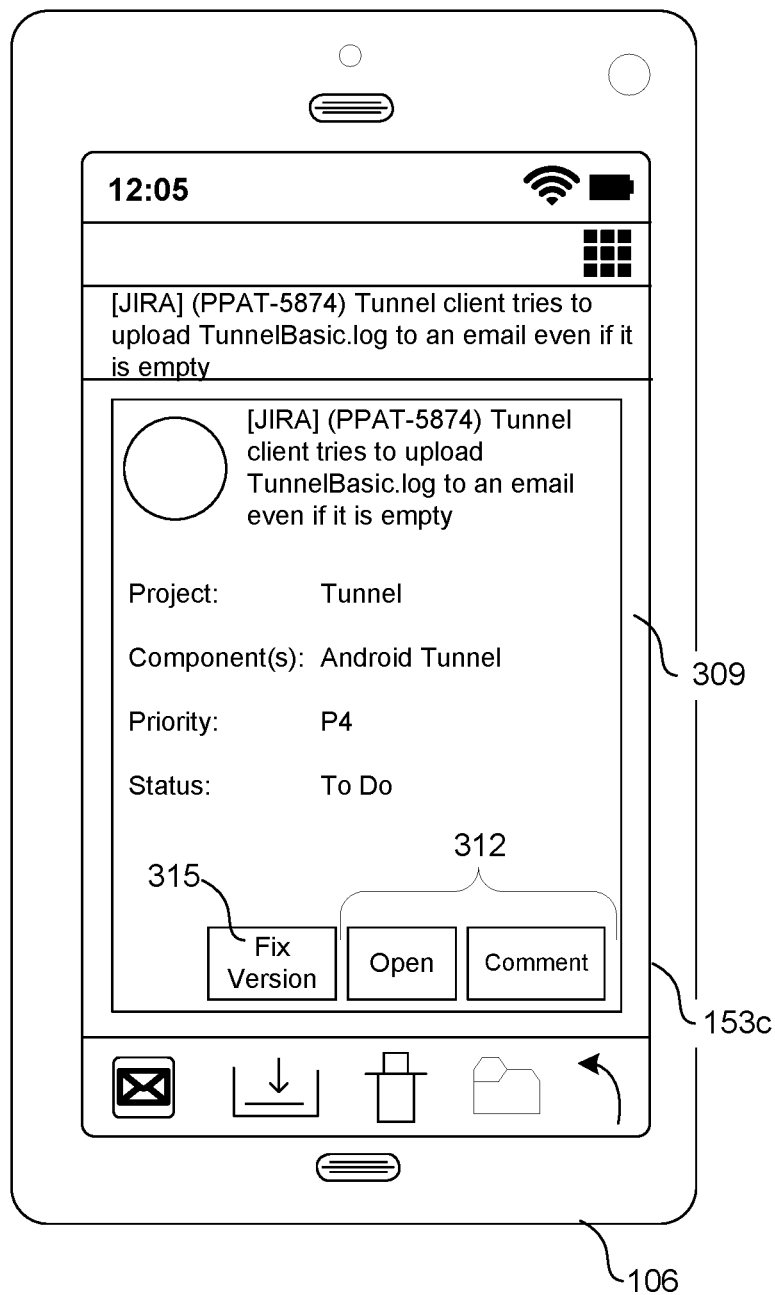

Moving on to FIGS. 3A-3C, shown are examples of user interfaces 153 (e.g., 153a, 153b, 153c) that can be rendered by the client application 150 of the client device 106. In particular, FIG. 3A illustrates a user interface 153a that includes a message 300 received by the client application 150 from the secure email gateway 121 and is displayed to the user interacting with the client application 150. The message 300 includes the message content 303 that provides a context to the user with respect to the message 300. In this example, the message content 303 includes the question "Can you please add the fixed version?" In accordance to examples provided in the disclosure, the intent identifier service 147 can extract the message content 303 from the message 300 and apply the message content 303 to the intent identification models 136 to determine the intent of the message 300. In this example, the intent can be determined to be "fix version."

FIG. 3B illustrates an example user interface 153*b* that can be displayed to the user in response to receiving the user interface element 309 from the workflow service 115 in response to a content request. FIG. 3B illustrates an example of the user interface element 309 including static action components 312 that do not correspond to the identified intent. Since the static action components 312 displayed in FIG. 3B fail to include an action associated with the context associated with the message 300 of FIG. 3A, to perform the action required, the user may have to access the third-party service 127 directly by leaving the client application 150 and undergoing and additional authentication process. This process can cause an annoyance to the user as they have to leave one application to access another application. In addition, additional network resources may be used to satisfy the additional steps required for the user to perform the task associated with the message 300 of FIG. 3A.

FIG. 3C illustrates an example user interface 153*c* that can be displayed to the user in response to receiving the user interface element 309 from the workflow service 115 in response to a content request. In contrast to the user interface element 309 of FIG. 3B, the user interface element 309 of FIG. 3C includes an dynamically generated action component 315 that corresponds to the intent (e.g., fix version) identified by the intent identifier service 147 of the secure email gateway 121 with respect to the message 300 of FIG. 3A. In this example, the user can select the dynamically generated action component 315 to trigger the associated action through the use of the connector 118 and without being redirected from the client application 150.

Figure 4:
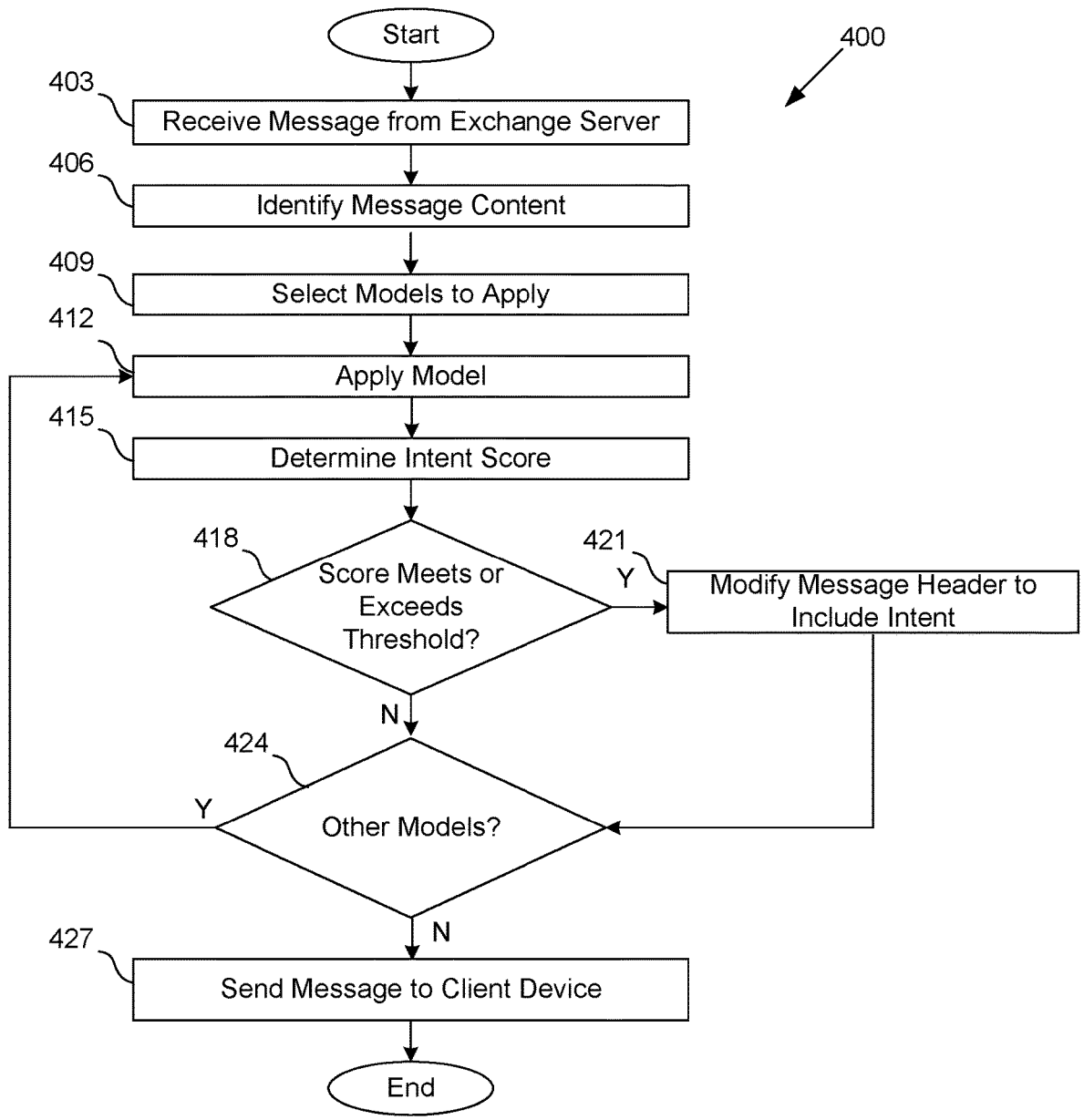
FIG. 4 is a flowchart depicting the operation of an example of a component of the computing environment of the network environment of FIG. 1.

Moving on to FIG. 4, shown is a flowchart 400 that provides one example of the operation of a portion of the network environment 100. The flowchart of FIG. 4 can be viewed as depicting an example of elements of a method implemented by the client application 150, or other components executing in the computing environment 103. The separation or segmentation of functionality as discussed herein is presented for illustrative purposes only.

Beginning with step 403, the secure email gateway 121 (FIG. 1) receives a message 300 (e.g., an email) (FIG. 3) from a message exchange server (e.g. Microsoft Exchange®). The secure email gateway 121 is a proxy service between the message exchange server and the network of client devices 106 (FIG. 1) within the enterprise environment. The secure email gateway 121 can access and distribute messages 300 received from the message exchange server in accordance to access permissions assigned by an administrator.

At step 406, the secure email gateway 121 via the intent identifier service 147 (FIG. 1) can analyze the message 300 to identify the message content 303 included in the message. For example, the intent identifier service 147 can use natural language processing techniques to identify the message content 303 included in the body of the message. In some examples, the intent identifier service 147 can parse the message content 303 to identify individual or groups of terms that can be used to determine context.

At step 409, the intent identifier service 147 can select a set of intent identification models 136. In some examples, all available intent identification models 136 are selected. In other examples, the intent identification models 136 that apply are selected based on the terms or groups of terms extracted from the message content 303. For example, the intent identification models 136 may include a keyword bank which can be compared to the terms extracted from the message content 303. If there is a match of keywords between the keyword bank of a particular intent identification model 136 and the message content 303, the intent identifier service 147 will select that particular intent identification model 136 to apply to the message content 303.

At step 412, the intent identifier service 147 can apply an intent identification model 136 from the selected intent identification models 136 to determine an intent of the message content. The intent identification models 136 include trained models that can be used for determining intent or other type of context from the message content 303 within a message 300. According to various examples, the intent identification models 136 can be based on natural processing language tools to learn and determine the intent, or other context, associated with a message 300. The output of the intent identification model 136 can include an identified intent. In some examples, the output can further include a score that is generated to identify a likelihood or level of certainty that the identified intent is the actual intent of the message 300.

At step 415, the intent identifier service 147 can determine the intent score associated with the output of the intent identification models 136. For example, the intent identifier service 147 can extract the intent score from the output of the intent identification model 136 to determine the intent score. In other examples, the intent identifier service 147 can determine the intent score based on other factors including, the intent identification model 136 used, a type of intent identified, other identified intents, the intent score included in output, and/or other factors. In some examples, the intent identifier service 147 can apply a set of predefined rules that may include weights to assign to the various factors. The sum of the weights can be used to generate an intent score.

At step 418, the intent identifier service 147 determines if the intent score meets or exceeds a predefined threshold. If the intent score meets or exceeds the threshold, the intent identifier service 147 proceeds to box 421. Otherwise, the intent identifier service 147 proceeds to box 424.

At box 421, the intent identifier service 147 modifies the message header to include the identified intent. In particular, the intent identifier service 147 can embed the intent in the message header so that the client application 150 can extract the intent upon receipt. In some examples, there may be multiple identified intents. As such, the intent identifier service 147 can embed multiple intents in the message header. In some examples, the different intents can have different levels of priority or importance. The priority can be based on the output score from the intent identification models 136 or other rules that may define a level of importance or priority for different types of intents which can also be defined in the message header.

At box 424, the intent identifier service 147 determines if there are other selected and available intent identification models 136 to apply to the message content 303. If there are other intent identification models 136, the intent identifier service 147 returns to step 412. Otherwise, the intent identifier service 147 proceeds to step 427.

At step 427, the secure email gateway 121 transmits the message 300 to the client device 106. The message 300 includes the modified message header including any identified intents. Thereafter, this portion of the process proceeds to completion.

The sequence diagrams of FIG. 2 and the flowchart of FIG. 4 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagram of FIG. 2 and the flowchart of FIG. 4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system for identifying message intent, the system comprising:
   a computing device;
   at least one application executable in the computing device, wherein, when executed, the at least one application causes the computing device to at least:
      identify message content within a message;
      determine an intent score and a message intent based on an output of one or more trained intent identification models being applied to the message content, the intent score indicating a likelihood that the message intent applies to the message content of the message;
      compare the intent score with a predefined threshold;
      embed the message intent in a header of the message in an instance in which the intent score meets or exceeds the predefined threshold; and
      transmit the message to a client device.

2. The system of claim 1, wherein, when executed, the at least one application causes the computing device to at least parse the message content into one or more content terms, the one or more content terms being analyzed by the one or more trained intent identification models to determine the intent score.

3. The system of claim 1, wherein, when executed, the at least one application causes the computing device to at least:
   compare one or more content terms in the message content with a respective keyword bank of a plurality of trained intent identification models; and
   select the one or more trained intent identification models from the plurality of trained intent identification models based on a respective match between the one or more content terms with the respective keyword bank.

4. The system of claim 1, wherein each of the one or more trained intent identification models are associated with a respective third-party service.

5. The system of claim 4, wherein, when executed, the at least one application causes the computing device to identify the respective third-party service based on at least one of the message content, the header of the message, or a sender address of a sender of the message.

6. The system of claim 1, wherein the message intent is one of a plurality of message intents identified in the message content based on the one or more trained intent identification models, the header of the message being embedded with the plurality of message intents.

7. The system of claim 1, wherein, when executed, the at least one application causes the computing device to at least upload the one or more trained intent identification models in response to an administrator-defined configuration.

8. A method for identifying message intent, the method comprising:
   identifying, by a computing device, message content within a message;

determining, by the computing device, an intent score and a message intent based on an output of one or more trained intent identification models being applied to the message content, the intent score indicating a likelihood that the message intent applies to the message content of the message;

comparing, by the computing device, the intent score with a predefined threshold;

embedding, by the computing device, the message intent in a header of the message in an instance in which the intent score meets or exceeds the predefined threshold; and transmitting, by the computing device, the message to a client device.

9. The method of claim 8, further comprising parsing the message content into one or more content terms, the one or more content terms being analyzed by the one or more trained intent identification models to determine the intent score.

10. The method of claim 8, further comprising:

comparing one or more content terms in the message content with a respective keyword bank of a plurality of trained intent identification models; and selecting the one or more trained intent identification models from the plurality of trained intent identification models based on a respective match between the one or more content terms with the respective keyword bank.

11. The method of claim 8, wherein each of the one or more trained intent identification models are associated with a respective third-party service.

12. The method of claim 11, further comprising identifying the respective third-party service based on at least one of the message content, the header of the message, or a sender address of a sender of the message.

13. The method of claim 8, wherein the message intent is one of a plurality of message intents identified in the message content based on the one or more trained intent identification models, the header of the message being embedded with the plurality of message intents.

14. The method of claim 8, further comprising uploading the one or more trained intent identification models in response to an administrator-defined configuration.

15. A non-transitory computer readable medium for identifying message intent, the non-transitory, computer readable medium comprising machine-readable instructions that, when executed by a processor of a computing device, cause the computing device to at least:

identify message content within a message;

determine an intent score and a message intent based on an output of one or more trained intent identification models being applied to the message content, the intent score indicating a likelihood that the message intent applies to the message content of the message;

compare the intent score with a predefined threshold;

embed the message intent in a header of the message in an instance in which the intent score meets or exceeds the predefined threshold; and transmit the message to a client device.

16. The non-transitory computer readable medium of claim 15, wherein the machine-readable instructions, when executed by the processor of the computing device, further cause the computing device to at least parse the message content into one or more content terms, the one or more content terms being analyzed by the one or more trained intent identification models to determine the intent score.

17. The non-transitory computer readable medium of claim 15, wherein the machine-readable instructions, when executed by the processor of the computing device, further cause the computing device to at least:

compare one or more content terms in the message content with a respective keyword bank of a plurality of trained intent identification models; and select the one or more trained intent identification models from the plurality of trained intent identification models based on a respective match between the one or more content terms with the respective keyword bank.

18. The non-transitory computer readable medium of claim 15, wherein each of the one or more trained intent identification models are associated with a respective third-party service.

19. The non-transitory computer readable medium of claim 18, wherein the machine-readable instructions, when executed by the processor of the computing device, further cause the computing device to at least:

identify the respective third-party service based on at least one of the message content, the header of the message, or a sender address of a sender of the message.

20. The non-transitory computer readable medium of claim 15, wherein the machine-readable instructions, when executed by the processor of the computing device, further cause the computing device to at least upload the one or more trained intent identification models in response to an administrator-defined configuration.

* * * * *